UNITED STATES PATENT OFFICE.

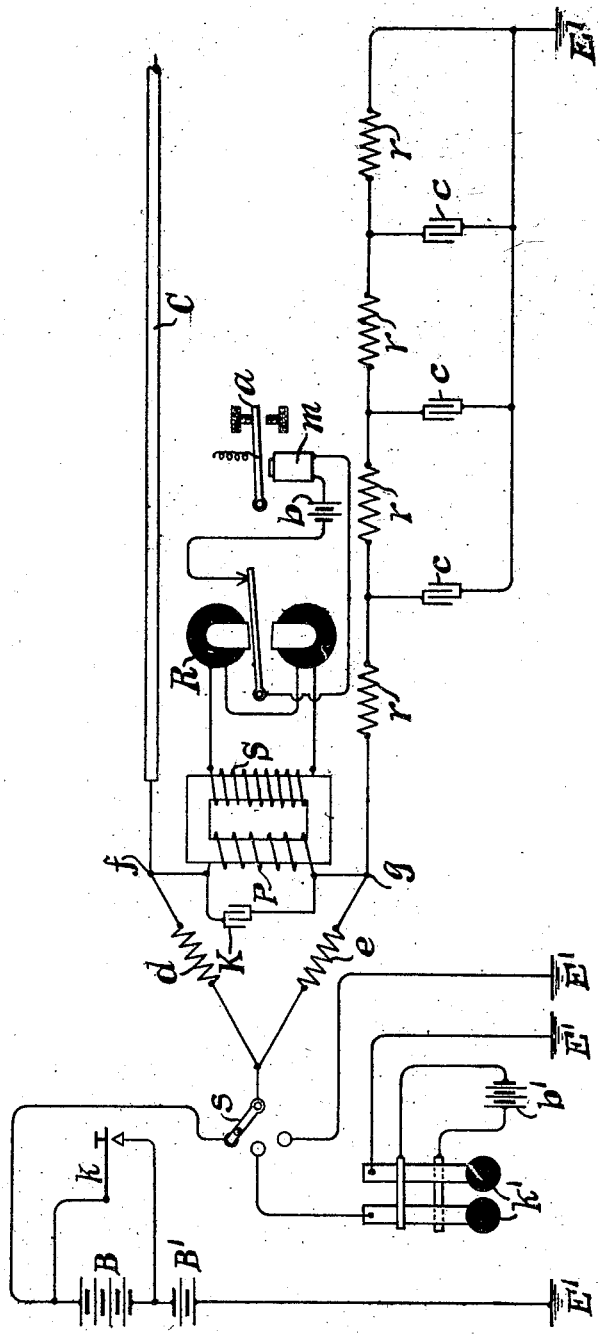

ISIDOR KITSEE, OF PHILADELPHIA, PENNSYLVANIA, ASSIGNOR, BY DIRECT AND MESNE ASSIGNMENTS, TO AMERICAN TELEPHONE AND TELEGRAPH COMPANY, OF NEW YORK, N. Y., A CORPORATION OF NEW YORK.

TELEGRAPH SYSTEM.

1,083,257. Specification of Letters Patent. Patented Dec. 30, 1913.

Application filed March 23, 1908, Serial No. 422,619. Renewed May 5, 1911. Serial No. 625,225.

*To all whom it may concern:*

Be it known that I, ISIDOR KITSEE, a citizen of the United States, residing at Philadelphia, county of Philadelphia, State of Pennsylvania, have invented certain new and useful Improvements in Telegraph Systems, of which the following is a specification.

My invention relates to a system of telegraphy, and more particularly to a system involving electrical communication over a conductor having relatively great capacity or distributed capacity, such, for example, as a submarine or subterranean cable or a long land line.

My invention resides more particularly in a duplex cable system involving an artificial line, a converter or transformer being included in the "bridge" of a Wheatstone bridge arrangement.

My invention resides in further features hereinafter pointed out and claimed.

For an illustration of one of the forms my invention may take, reference is to be had to the accompanying drawing, which is a diagrammatic illustration of a duplex line or cable system involving my invention.

In the drawing, C represents a line or cable having relatively great capacity or distributed capacity, and over which it is desired to transmit signals. One end of the submarine or other cable and a single station only are shown.

The artificial line or cable, of the duplex system, is represented by the resistances $r$ and the condensers $c$ all connected as shown to earth at E. The usual resistances $d$ and $e$ are provided in the two arms of the Wheatstone bridge arrangement, the real line or cable C forming another arm of the Wheatstone bridge, and the artificial line or cable forming the fourth arm. In the "bridge," that is, between the points $f$ and $g$, is the primary P of a converter or transformer, the secondary S being connected to the winding of the polarized relay R, which, in turn, controls a local circuit including the battery and the magnet $m$ of any suitable device, such as a sounder, recorder, etc., the spring retracted armature being shown at $a$.

Between the Wheatstone bridge and earth E' may be connected, by moving the switch $s$ to the proper point, the double key $k'$ controlling the battery $b'$, in the manner well understood in the art, to impress upon the line or cable currents of either polarity. Or, by moving the switch $s$ to the proper point, the opposed sources of energy B and B' are brought into communication with the cable, the operator's key $k$ shunting one of said opposed sources. By manipulating the key $k$, the operator transmits to line impulses alternating in polarity. Or, by moving the switch $s$ to a third point, the Wheatstone bridge arrangement may be connected directly to earth. In all three positions of the switch $s$, however, the connection from the Wheatstone bridge arrangement or from the cable is a conductive one to earth, the condenser commonly used heretofore being omitted.

In operation, this duplex system is similar to duplex systems existing in the art, except that a converter is used in the "bridge", and the first increments of impulse, through the intervention of the transformer, affect or control the relay. By such system, two messages may be transmitted simultaneously over the line or cable in opposite directions, and the signaling is rapid, and by the arrangement shown, affords means for producing either an audible or visible record, and will secure a speed of signaling greater than with usual siphon recorder.

The converter or transformer is shown as of the closed magnetic circuit type, but it is to be understood that any form of closed magnetic circuit transformer may be employed, or that a transformer having an open magnetic circuit may be employed.

A condenser K is shown connected in parallel with the primary P. When this condenser is of suitable capacity, it sometimes aids in the reception of signals, though it is to be understood that the condenser K may be entirely omitted.

The use of the transmitter comprising sources B and B' with the key $k$ is preferred, because whether the key $k$ be open or closed, the cable is always subjected to electrical potential, and impulses alternating in polarity are transmitted to line, and high signaling speed is attainable.

While I have shown the transformer or converter as having two independent windings P and S, it is to be understood that I may employ an auto-transformer with means for adjusting the number of turns connected between $f$ and $g$, and means for adjusting the number of turns included in the circuit of the windings of the relay R.

What I claim is:

1. In a telegraph system, the combination with a line or cable having great capacity, of means for impressing current upon said line or cable, a transformer at the receiving end of said line or cable, the transformer primary being associated with said line or cable, a condenser in shunt with said primary, and a signal translating instrument controlled by the transformer secondary.

2. In a duplex telegraph system, the combination with a line or cable having great capacity, of an artificial line or cable, a transformer having its primary associated with said line or cable and with said artificial line or cable, a condenser connected in shunt with the transformer primary, and a signal translating instrument controlled by the transformer secondary.

3. In a duplex telegraph system, the combination with a line or cable having great capacity, of an artificial line or cable, a conductive connection from said line or cable to earth exclusive of said artificial line or cable, a transformer having its primary associated with said line or cable and with said artificial line or cable, a condenser in shunt with the transformer primary, and a signal translating instrument controlled by the transformer secondary.

4. In a duplex telegraph system, the combination with a line or cable having great capacity, of an artificial line or cable, said line or cable and artificial line or cable forming arms of a Wheatstone bridge, a conductive connection from said Wheatstone bridge to earth exclusive of said artificial line, a transformer having its primary connected in the bridge, a condenser in shunt with the transformer primary, and a signal translating instrument controlled by the transformer secondary.

In testimony whereof I have hereunto affixed my signature in the presence of the two subscribing witnesses.

ISIDOR KITSEE.

Witnesses:
  ANNA E. STEINBOCK,
  SADIE P. EAGAN.